United States Patent
Pal

(10) Patent No.: US 11,188,690 B1
(45) Date of Patent: Nov. 30, 2021

(54) SYSTEMS AND METHODS FOR PERFORMING THERMAL SIMULATION OF AN ADDITIVE MANUFACTURING PROCESS

(71) Applicant: Ansys, Inc., Canonsburg, PA (US)

(72) Inventor: Deepankar Pal, Salt Lake City, UT (US)

(73) Assignee: Ansys, Inc., Canonsburg, PA (US)

( * ) Notice: Subject to any disclaimer, the term of this patent is extended or adjusted under 35 U.S.C. 154(b) by 442 days.

(21) Appl. No.: 16/191,008

(22) Filed: Nov. 14, 2018

Related U.S. Application Data

(60) Provisional application No. 62/586,793, filed on Nov. 15, 2017.

(51) Int. Cl.
| | |
|---|---|
| *G06F 30/20* | (2020.01) |
| *G06F 30/39* | (2020.01) |
| *G06F 30/398* | (2020.01) |
| *G06F 30/367* | (2020.01) |

(52) U.S. Cl.
CPC ............ *G06F 30/20* (2020.01); *G06F 30/367* (2020.01); *G06F 30/39* (2020.01); *G06F 30/398* (2020.01)

(58) Field of Classification Search
CPC ........ G06F 30/20; G06F 30/367; G06F 30/39; G06F 30/398
USPC .................................................. 703/2, 5, 18
See application file for complete search history.

(56) References Cited

U.S. PATENT DOCUMENTS

| | | | | |
|---|---|---|---|---|
| 7,867,016 B2* | 1/2011 | Nabilek | ................. | H01R 13/08 |
| | | | | 439/474 |
| 8,104,007 B2* | 1/2012 | Kariat | ................... | G06F 30/367 |
| | | | | 716/110 |
| 8,740,958 B2* | 6/2014 | Anderson | ............ | A61B 5/0036 |
| | | | | 607/89 |
| 9,522,426 B2* | 12/2016 | Das | ....................... | B29C 64/153 |
| 2007/0043341 A1* | 2/2007 | Anderson | .............. | A61B 34/72 |
| | | | | 606/12 |

(Continued)

*Primary Examiner* — Thai Q Phan
(74) *Attorney, Agent, or Firm* — Jones Day

(57) ABSTRACT

Systems and methods are provided for performing a thermal simulation of an additive manufacturing process. In embodiments, one or more data sets (such as a temperature dependent thermal conductivity matrix and a temperature dependent heat capacity matric) characterize an ease of heat flow through a three-dimensional (3D) geometry. The one or more data sets are used to determine a thermal solution for an explicit solution length, where the explicit solution length is a length along a scan line of one two dimensional (2D) slice of the 3D geometry. A thermal solution for the scan line is generated by propagating the thermal solution for the explicit solution length along sequential time steps of the scan line and using Eigenmodal cooling to adjust for cooling of a heat residual between sequential time steps. A thermal solution for the 2D slice is generated by propagating the thermal solution for the scan line along sequential scan lines of the 2D slice and using Eigenmodal cooling to adjust for cooling of a heat residual between sequential scan lines. A thermal solution for the 3D geometry is generated by propagating the thermal solution for the 2D slice along sequential 2D slices of the 3D geometry and using Eigenmodal cooling to adjust for cooling of a heat residual between sequential 2D slices.

20 Claims, 12 Drawing Sheets

(56) References Cited

U.S. PATENT DOCUMENTS

| | | | | |
|---|---|---|---|---|
| 2009/0124029 | A1* | 5/2009 | Silverbrook | B41J 2/16 |
| | | | | 438/21 |
| 2010/0172867 | A1* | 7/2010 | Ali | A61P 35/02 |
| | | | | 424/85.4 |
| 2010/0189313 | A1* | 7/2010 | Prokoski | G01K 13/20 |
| | | | | 382/118 |
| 2011/0319877 | A1* | 12/2011 | Anderson | A61B 5/72 |
| | | | | 606/10 |
| 2014/0069488 | A1* | 3/2014 | Tanaka | H01B 1/22 |
| | | | | 136/252 |
| 2014/0163717 | A1* | 6/2014 | Das | C30B 19/08 |
| | | | | 700/119 |
| 2017/0083003 | A1* | 3/2017 | Arisoy | G06F 30/00 |
| 2017/0372480 | A1* | 12/2017 | Anand | G06T 19/20 |
| 2018/0154484 | A1* | 6/2018 | Hall | B22F 12/00 |
| 2018/0268091 | A1* | 9/2018 | Arisoy | G06T 17/005 |
| 2019/0129026 | A1* | 5/2019 | Sumi | G01S 15/8997 |
| 2019/0188346 | A1* | 6/2019 | Mirabella | G06F 30/20 |
| 2019/0275585 | A1* | 9/2019 | Akram | G06F 30/20 |

* cited by examiner

US 11,188,690 B1

SYSTEMS AND METHODS FOR PERFORMING THERMAL SIMULATION OF AN ADDITIVE MANUFACTURING PROCESS

CROSS-REFERENCE TO RELATED APPLICATION

This application claims priority from U.S. Provisional Patent Application No. 62/586,793, filed on Nov. 15, 2017, and titled "Systems and Methods for Performing Thermal Solving for Simulation and Implementation of Additive Manufacturing Process," the entirety of which is incorporated herein by reference

TECHNICAL FIELD

The technology described herein relates generally to computer-aided design (CAD) tools and more particularly to systems and methods for performing a thermal simulation of an additive manufacturing process.

BACKGROUND

FIG. 1 is a diagram depicting an example additive manufacturing (e.g., 3D printing) process that utilizes a laser beam melting (LBM) technique. LBM additive manufacturing is commonly used to produce metal parts from a metallic powder. A typical LBM additive manufacturing system 100, as shown in FIG. 1, includes a laser emitting device 102 and a powder deposition device 104 that are controlled by a computer system (not shown) based, for example, on a computer-aided design (CAD) file, to generate a solid geometry 106 from a metallic powder (referred to as the powder feedstock). In operation, the solid geometry 106 is created by rolling down a layer of the powder feedstock using the powder deposition device 104, melting the powder layer with a beam emitted by a heat source such as the laser emitting device 102 in a specific pattern, allowing the melted layer to cool into a solid, and repeating the process to build the solid geometry 106, layer-by-layer.

SUMMARY

Systems and methods are provided for performing a thermal simulation of an additive manufacturing process. In embodiments, one or more data sets (such as a temperature dependent thermal conductivity matrix and a temperature dependent heat capacity matrix) characterize an ease of heat flow through a three-dimensional (3D) geometry. The one or more data sets are used to determine a thermal solution for an explicit solution length, where the explicit solution length is a length along a scan line of one two dimensional (2D) slice of the 3D geometry. A thermal solution for the scan line is generated by propagating the thermal solution for the explicit solution length along sequential time steps of the scan line and using Eigenmodal cooling to adjust for cooling of a heat residual between sequential time steps. A thermal solution for the 2D slice is generated by propagating the thermal solution for the scan line along sequential scan lines of the 2D slice and using Eigenmodal cooling to adjust for cooling of a heat residual between sequential scan lines. A thermal solution for the 3D geometry is generated by propagating the thermal solution for the 2D slice along sequential 2D slices of the 3D geometry and using Eigenmodal cooling to adjust for cooling of a heat residual between sequential 2D slices.

DETAILED DESCRIPTION

Figure 1:
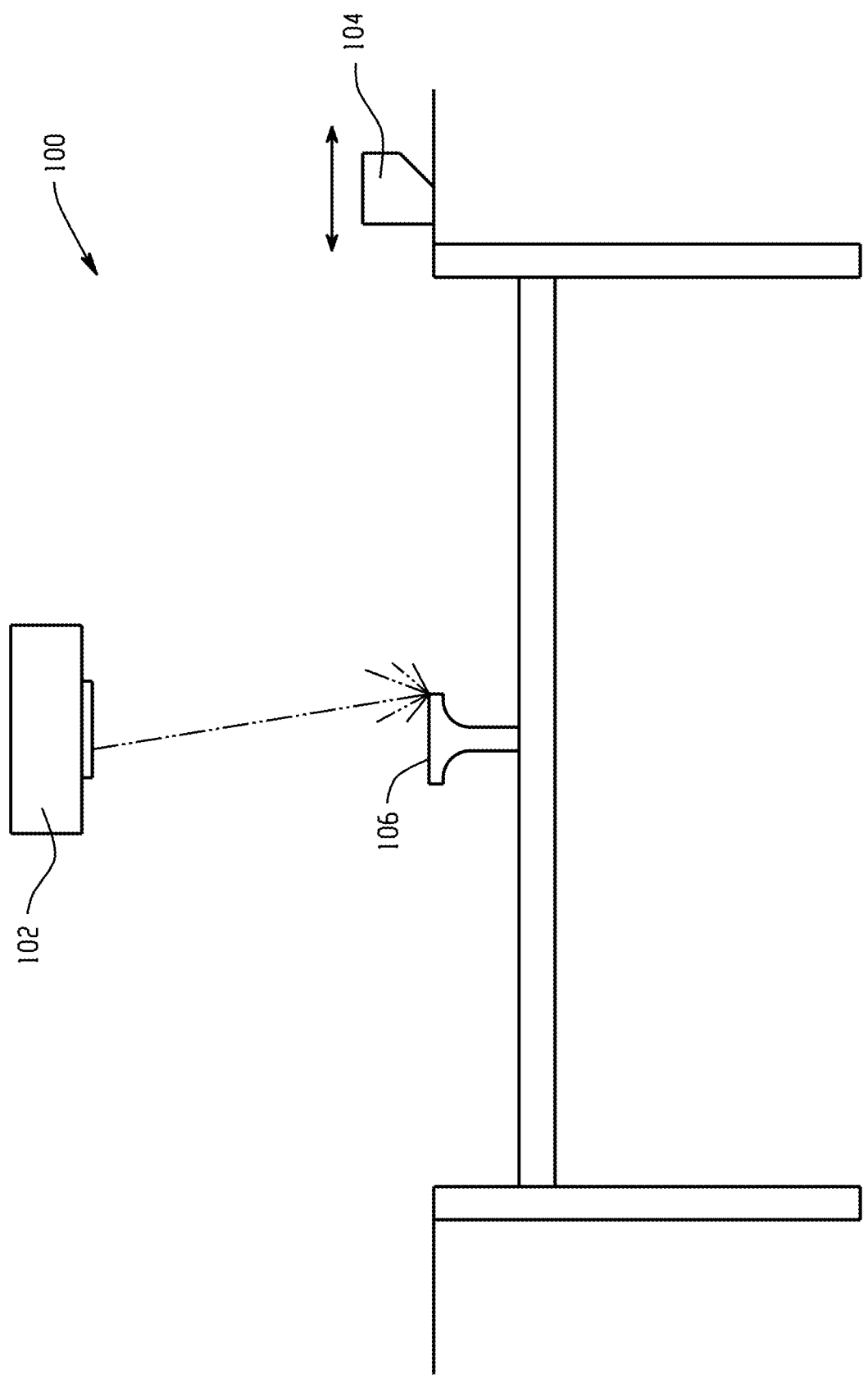
FIG. 1 is a diagram depicting an example additive manufacturing process.
Figure 2:
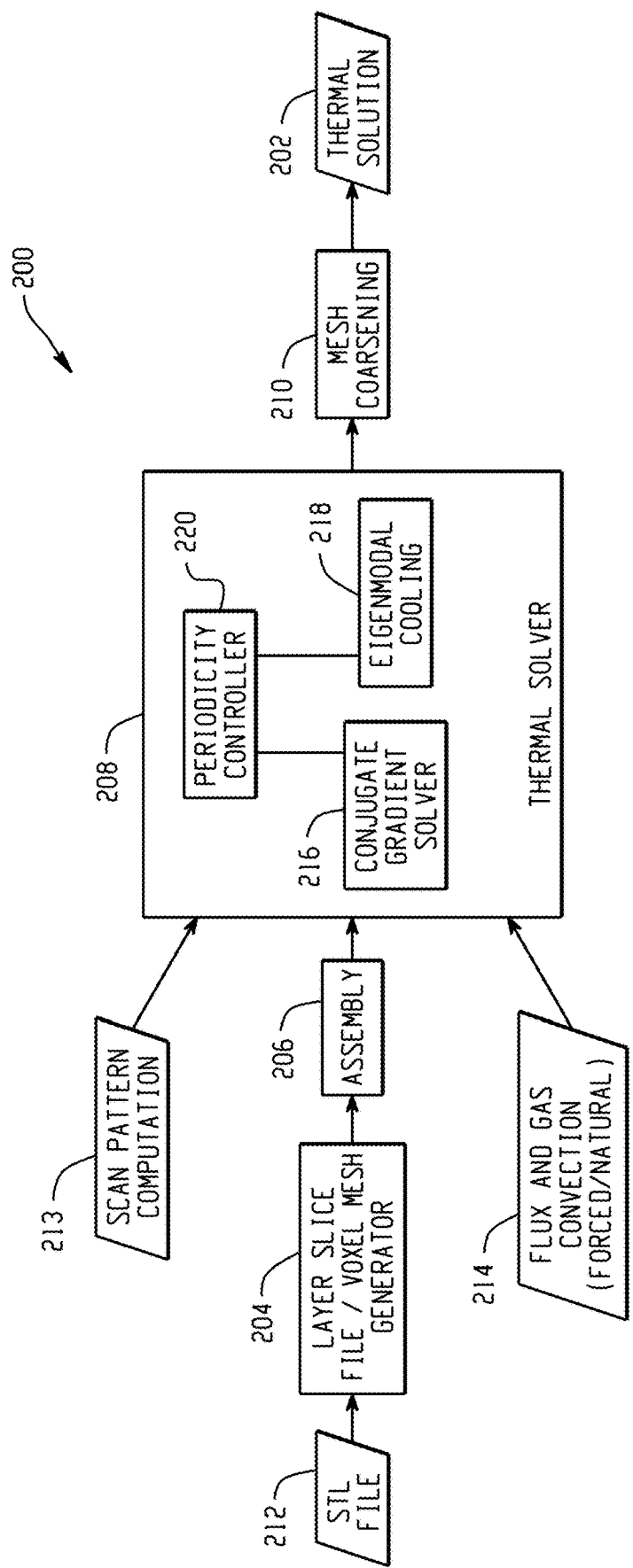
FIG. 2 is a diagram of an example system for performing a thermal simulation of an additive manufacturing process.

FIG. 2 is a diagram of an example system 200 for performing a thermal simulation of an additive manufacturing process to generate a thermal solution 202 for a three-dimensional (3D) geometry produced by the additive manufacturing process. The system 200 depicted in FIG. 2 may, for example, generate a thermal solution 202 for a 3D model geometry to be produced by the LBM additive manufacturing system 100 as shown in FIG. 1. The system 200 shown in FIG. 2 includes a layer slice file/voxel mesh generator 204, an assembly module 206, a thermal solver 208, and a mesh coarsening module 210 for data storage reduction, each of which may, for example, be implemented using software stored on one or more non-transitory computer-readable medium and executed by one or more processor.

The system 200 receives a computer-aided design file 212 (e.g., an "STL file" generated using stereolithography CAD software) that provides design details for the 3D geometry to be produced by the additive manufacturing process. The computer-aided design file 212 may, for example, provide a triangulated representation of the surface of the 3D geometry. The computer-aided design file 212 may be received from a user input to the system 200, from an input from another system (e.g., from a CAD system), or by other suitable means.

The computer-aided design file 212 is received by the layer slice file/voxel mesh generator 204, which generates a layer slice file and a voxel mesh file from the computer-aided design file 212. In the illustrated embodiment, the layer slice file generation and voxel mesh file generation operations are shown as performed by a single software module 204. It should be understood, however, that in embodiments, the layer slice file and the voxel mesh file may be generated by separate software modules.

The layer slice file is generated by breaking the 3D geometry from the computer-aided design file 212 into two dimensional (2D) sections (referred to as 2D slices). The 2D slices for the 3D geometry may be stored as subfiles and may include a planar intercept (2D contour) of the 3D geometry at a constant height from the base of the 3D model with or without support structures. Generally, the height at which the layer slice file is generated is an integral multiple of the layer thickness. The 2D contour may, for example, be generated using a ray tracing/winding number algorithm.

The voxel mesh file is created by voxelizing the 3D cuboidal powder bed to provide a uniform grid of elements. The contour included inside the 2D geometry file 212, which serves as the top layer for simulation as soon as the layer number is appended in the simulation 'for' loop, may be used for gradually switching the voxel states from powder to solid as the laser traverses and melts the powder inside and on the contour. In addition to providing an envelope for switching voxel states from powder to solid when the laser is exposed directly on top of a voxel, the 2D geometry may also be used to switch voxel states after exposure, for example when an incompletely melted region solidifies during subsequent laser exposure on appending future layers in simulation. The 2D geometry and contours are utilized because the state tracking and laser exposure is only constrained to the (x,y) bounds contained therein.

The assembly module 206 receives the layer slice file and voxel mesh file and performs a finite element assembly to generate one or more data sets (e.g., matrices) that characterize the ease of heat flow through the 3D powder bed with various states such as powder or solid. In one embodiment, the assembly module 206 may generate a global stiffness matrix for the 3D geometry using conventional methods. Stiffness, in its conventional sense, is a measure of resistance towards deformation. In finite elements, a computational domain is first discretized into smaller elements and then the thermal stiffness is computed using $\int B^T CB(\det J)\, dv$ for each element where the B matrix is used for mapping the Temperature at element nodes to Temperature gradients at the integration point, C is used for denoting the anisotropic element thermal conductivity, detJ is the determinant of the element Jacobian and is used for measuring the shape correction factor of a generalized shaped element with respect to a reference shape of a cubic Master element of dimensions $(-1,1)^3$ in x, y and z dimensions respectively, and dv is used for denoting a differential volume of the Master element mentioned herein. Following this step, the stiffness in each element is assembled to create a global stiffness matrix of the size: (degrees of freedom)×(degrees of freedom). The degrees of freedom in the case of a thermal solver equals the number of discretization points or nodes present in the system because temperature is a scalar physical quantity and doesn't require direction such as displacements in mutually orthogonal x, y and z directions.

Figure 3A:
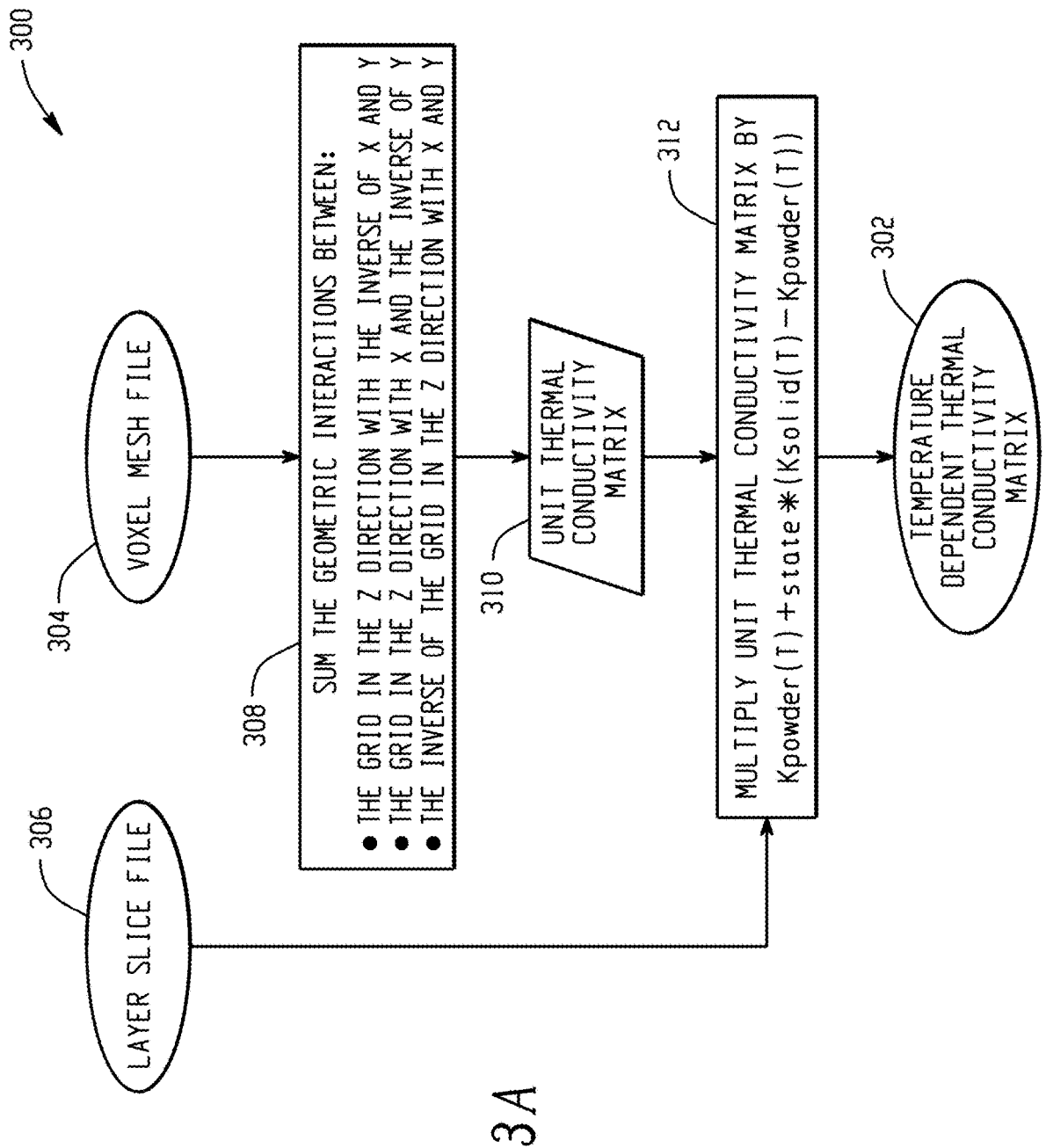
FIG. 3A is a flow diagram of an example method for generating a temperature dependent thermal conductivity matrix for a three dimensional (3D) geometry.
Figure 3B:
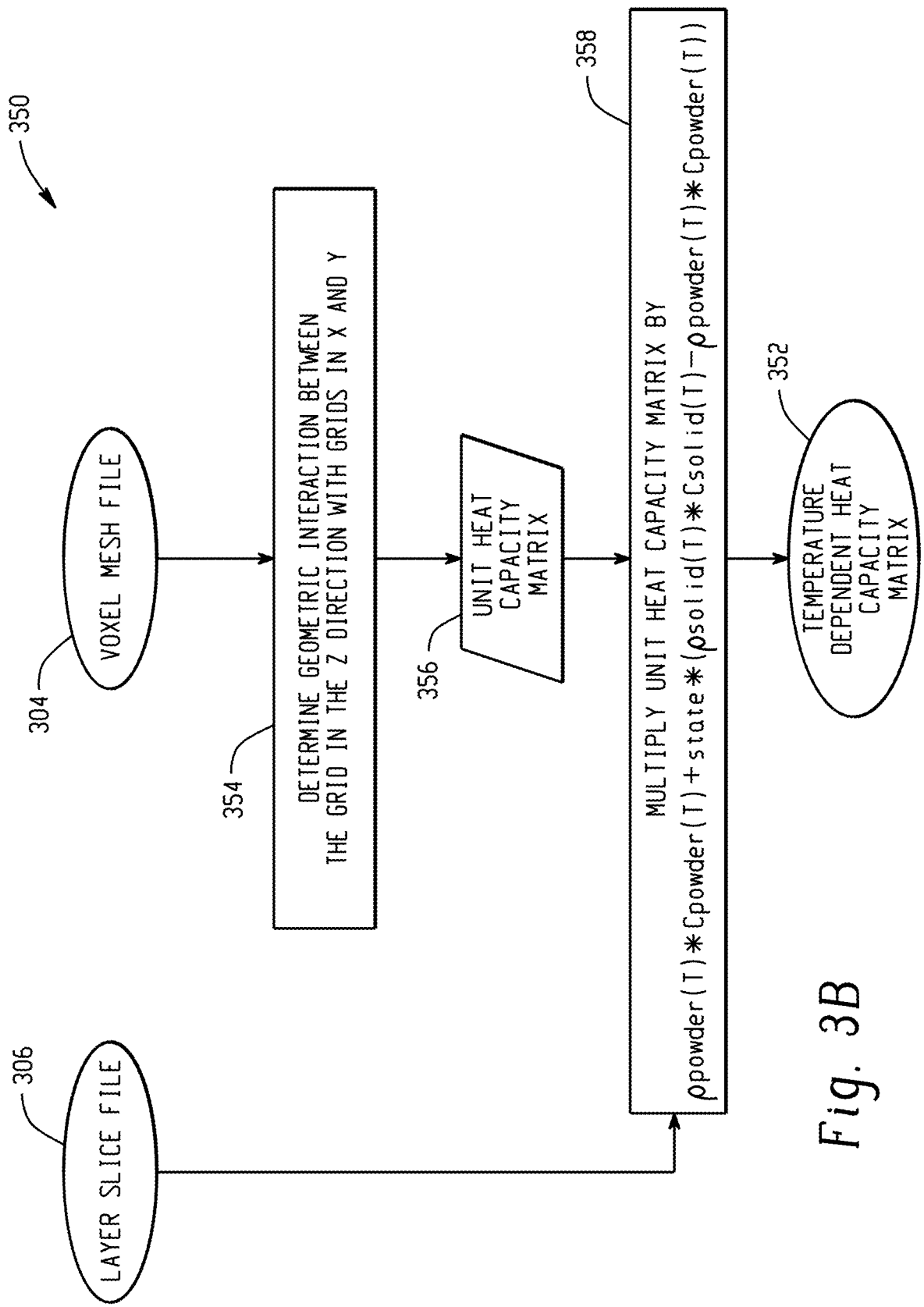
FIG. 3B is a flow diagram of an example method for generating a temperature dependent heat capacity matrix for a 3D geometry.

In other embodiments, the assembly module 206 may instead generate temperature dependent thermal conductivity and heat capacity matrices using non-conventional methods. Due to the dynamic nature of the problem, two physical quantities of interest, namely the baseline thermal conductivity and heat capacity matrices, may be determined using tensor product architectures for unit scalar thermal conductivity, density and specific heat values. Appropriate amplification factors may then be applied to construct the temperature dependent thermal conductivity and heat capacity matrices with thermal non-linear and state (powder/liquid/solid) sensitivities. FIGS. 3A and 3B depict example methods that may be used by the assembly module 206 to generate the temperature dependent thermal conductivity and heat capacity matrices. Advantageously, the use of the methods depicted in FIGS. 3A and 3B may be less time consuming and more accurate than calculating thermal stiffness matrix and heat capacity matrices using conventional methods for voxel elements.

With reference first to FIG. 3A, this figure depicts an example method 300 for generating a temperature dependent thermal conductivity matrix 302 for a 3D powder bed. The method 300 receives a voxel mesh file 304 for the powder bed and layer slice file 306 for the 3D geometry, for example from the layer slice file and voxel mesh generator of FIG. 2. At step 308, the voxel mesh file 304 is used to determine three quantities of interest with unit thermal conductivity: (1) the geometric interaction between the grid in the z direction with the inverse of x and y; (2) the geometric interaction between the grid in the z direction with x and the inverse of y; and (3) the geometric interaction between the inverse of the grid in the z direction with x and y. These three quantities are summed to generate a unit thermal conductivity matrix 310. The unit thermal conductivity matrix is used for the computational determination of the ease of heat transfer in the spatial computational domain based on geometric placement of discretized nodes in a steady-state thermal scenario assuming a unit thermal conductivity value.

At step 312, the unit thermal conductivity matrix 310 is multiplied by physical quantities of interest obtained from the layer slice file 306 to generate the state and temperature dependent thermal conductivity matrix 302 as a function of laser exposure location and temperature fields obtained, for example, using the 'state' timestamped at the end of a previous time-step. Specifically, in the illustrated embodiment, the unit thermal conductivity matrix 301 is multiplied by the factor $(K_{powder}(T)+\text{state}*(K_{solid}(T)-K_{powder}(T)))$ to obtain the temperature dependent thermal conductivity matrix 302, where $K_{powder}(T)$ is the thermal conductivity of the powder voxel which is assumed to be the same as that of the additive manufacturing powder bed as a function of temperature, $K_{solid}(T)$ is the thermal conductivity of the solid voxel as a function of temperature, and state is a voxel state identifier (e.g., 0 for powder and 1 for solid).

FIG. 3B depicts an example method 350 for generating a temperature dependent heat capacity matrix 352 for the 3D powder bed. Like the method depicted in FIG. 3A, this method 350 receives the voxel mesh file 304 for the 3D powder bed and layer slice file 306 for the 3D geometry, for example from the layer slice file and voxel mesh generator of FIG. 2. At step 354, the voxel mesh file 304 is used to determine the geometric interaction between the grid in the z direction with grids in x and y, with unit specific heat and density, to determine a unit heat capacity matrix 356. The unit heat capacity matrix is used for the computational determination of the ease of heat transfer in the temporal computational domain based on geometric placement of discretized nodes in a fully transient thermal scenario assuming a unit density and specific heat value.

At step 358, the unit heat capacity matrix 356 is multiplied by physical quantities of interest obtained from the layer slice file 306 to generate the state and temperature dependent heat capacity matrix 352 as a function of laser exposure location and temperature fields obtained, for example, using the 'state' timestamped at the end of previous time-step. Specifically, in the illustrated embodiment, the unit heat capacity matrix 356 is multiplied by the factor $(\rho_{powder}(T)*C_{powder}(T)+\text{state}*(\rho_{solid}(T)*C_{solid}(T)-\rho_{powder}(T)*C_{powder}(T)))$ to obtain the temperature dependent heat capacity matrix 352, where $\rho_{powder}(T)$ is the density of the powder voxel which is assumed to be the same as that of the additive manufacturing powder bed as a function of temperature, $C_{powder}(T)$ is the specific heat of the powder voxel which has been assumed to be the same as that of the additive manufacturing powder bed as a function of temperature, $\rho_{solid}(T)$ is the density of the solid voxel as a function of temperature, $C_{solid}(T)$ is the specific heat of the solid voxel as a function of temperature, and state is a voxel state identifier (e.g., 0 for powder and 1 for solid).

With reference again to FIG. 2, the one or more ease of heat flow matrices generated by the assembly module 206 (e.g., the state and temperature dependent thermal conductivity matrix 302 and the state and temperature dependent heat capacity matrix 352) are received by the thermal solver 208, along with scan pattern computation data 213 and flux and 'purging' gas convection data 214. The scan pattern computation 213 data includes information identifying the pattern (e.g., x, y and timing information of laser exposure) in which the laser in the additive manufacturing system under simulation will scan the top surface of the slice. The flux and gas convection data 215 includes information regarding the thermal flux and gas convection provided by the additive manufacturing system under simulation. For example, the flux information may identify the type of energy or heat pattern that is applied to the powder bed, such as a Gaussian, top-hat, stepped pattern or some other type of pattern. The gas convection information may identify the type of 'purging' gas (e.g., Argon gas or Nitrogen gas) and gas flow rate that is utilized by the additive manufacturing system under simulation.

Figure 4:
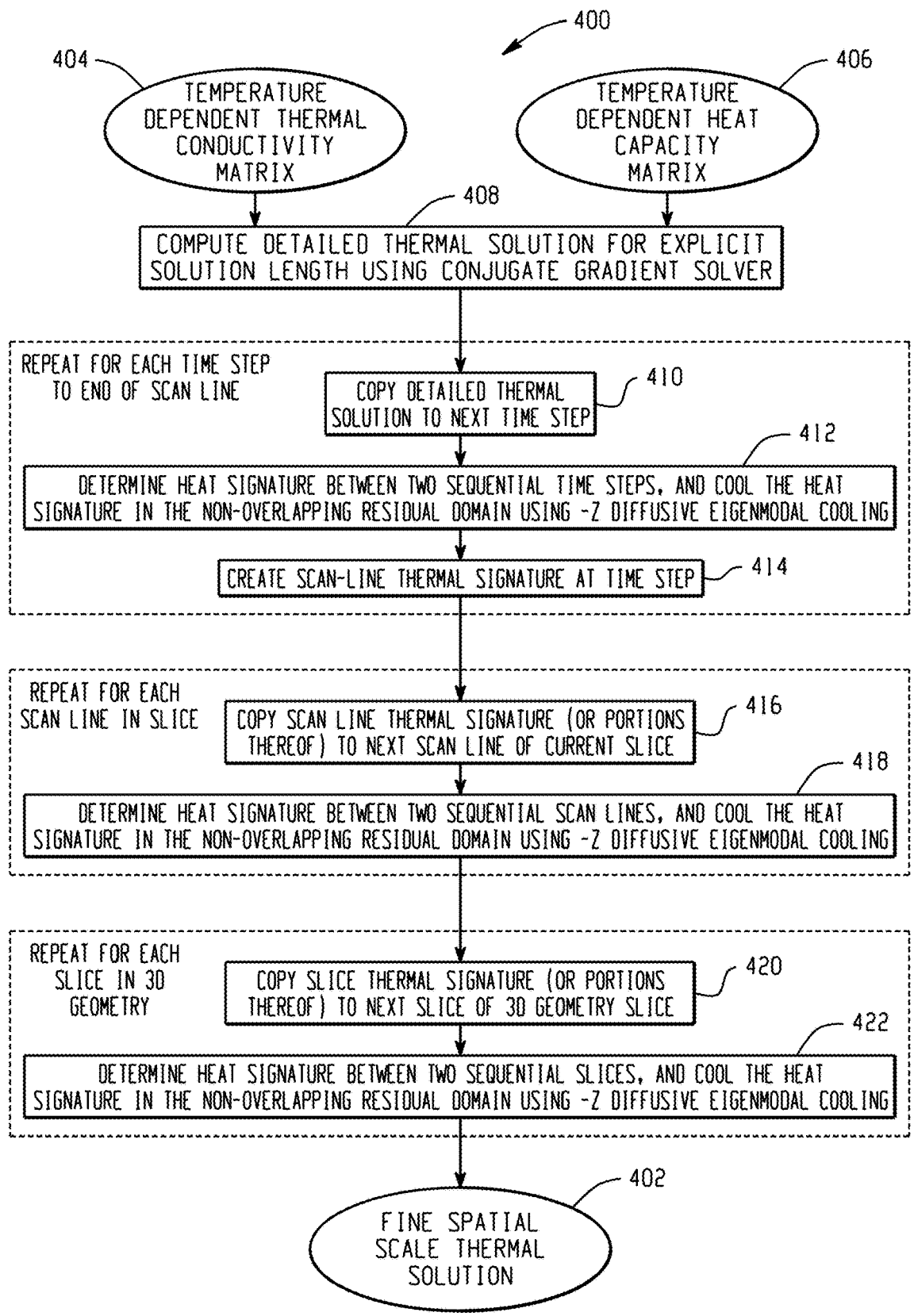
FIG. 4 is a flow diagram of an example method for generating a fine spatial scale thermal solution for a 3D geometry.
Figure 5:
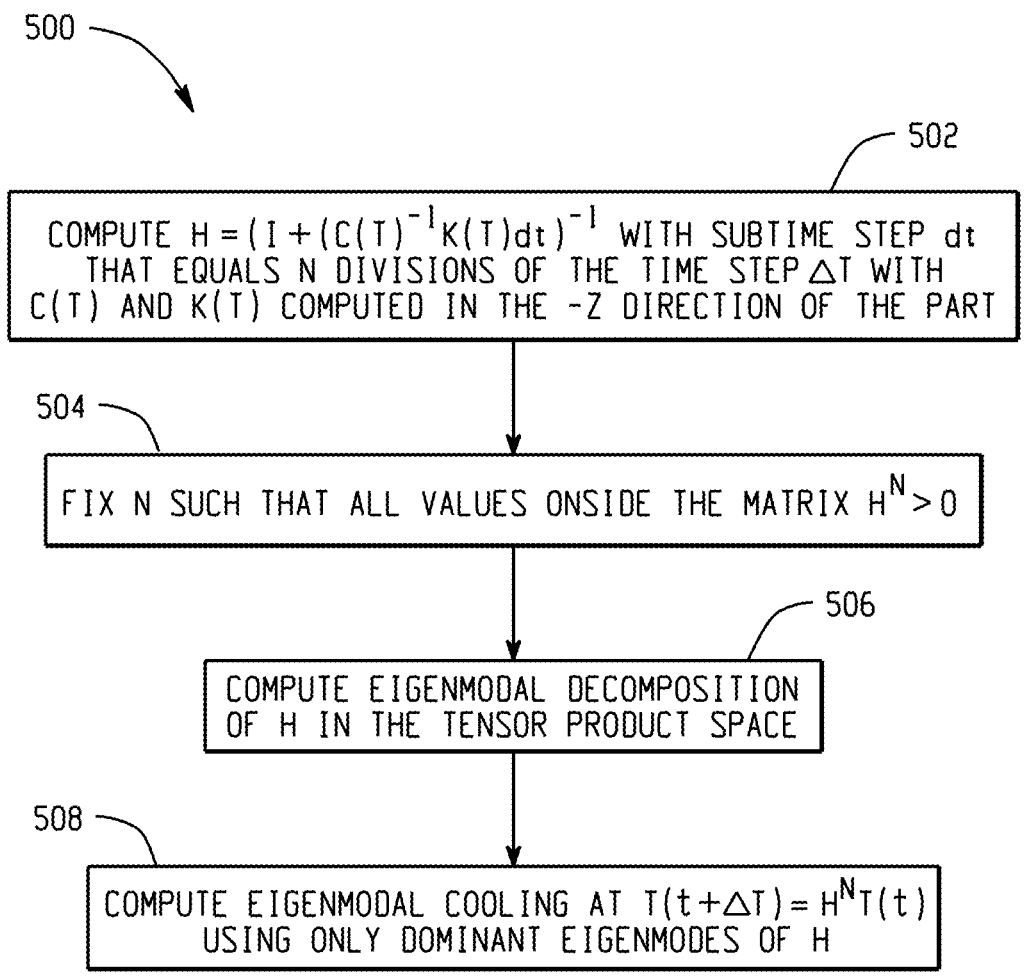
FIG. 5 is a flow diagram of an example method for Eigenmodal cooling.

The thermal solver 208 utilizes a conjugate gradient solver 216 and an Eigenmodal cooling module 218, both under the control of a periodicity controller 220, to generate a fine spatial scale thermal model for the 3D geometry. In embodiments, the conjugate gradient solver 216 may be a conjugate gradient Jacobi solver, such as the PCG (Pre-Conditioned Conjugate Gradient) solver provided by the Intel® Math Kernal Library (MKL). Under control of the periodicity controller 220, the conjugate gradient solver 216 is used to calculate a detailed 3D thermal solution for one small section of one 2D slice of the 3D geometry, referred to herein as the explicit solution length. The detailed thermal solution for the explicit solution length is then utilized by the periodicity controller 220, along with calculations from the Eigenmodal cooling module, to generate a global thermal solution for the entire 3D geometry. In embodiments, this operation is performed by copying the detailed thermal solution for the explicit solution length to advancing laser exposure domains in a sequential manner, followed by the computation of the cooling of heated and already cooled counterparts (from the $(t-1)^{th}$ step) in a sequential manner for another time step. FIGS. 4 and 5 depict an example method that may be used by the thermal solver 208 to generate the fine spatial scale thermal solution for the 3D geometry. Advantageously, the use of the method depicted in FIGS. 4 and 5 may require less time and computational resources compared to conventional methods, for example because a detailed thermal solution only needs to be calculated for the explicit solution length.

FIG. 4 is a flow diagram of an example method 400 for generating a thermal solution 402 for a 3D geometry. The method 400 receives a temperature dependent thermal conductivity matrix 404 and a temperature dependent heat capacity matrix 406, for example from the assembly module 206 of FIG. 2. At step 408, a detailed thermal solution is determined for an explicit solution length, for example using a conjugate gradient solver. The explicit solution length is preferably a small length (e.g., 1 mm) along a scan line of one 2D slice and the simulation volume below it of the 3D geometry. In embodiments, the thermal solution for the explicit solution length may be computed for two state variations: powder on powder and powder on solid combinations. Depending on the type of variation (powder on powder and powder on solid) existing in the −z direction statemap at the next time-step-appropriate variation of the detailed explicit thermal solution is copied and then the non-overlapped region is cooled using Eigenmodal cooling. The detailed thermal solution for the explicit solution length may, for example, be determined by the conjugate gradient solver 216 under control of the periodicity controller 220 of FIG. 2. The detailed thermal solution may, for example, be determined using existing conjugate gradient Jacobi solvers, such as PCG.

At steps 410-414, the simulation is progressed such that the detailed thermal solution from t=t−1 is propagated along the scan line in the heat source (e.g., laser) movement direction, and the heat residual between t and t−1 is cooled using explicit Eigenmodes, resulting in a thermal signature of an entire scan line at different time steps. Specifically, at step 410 the detailed thermal solution is copied to the next time step along the scan line. Then, at step 412, the heat signature is determined between two sequential time steps (t and t−1), and the determined heat signature is cooled in the non-overlapping residual domain using −z diffusive Eigenmodal cooling. The result of step 412 is used to create a scan-line thermal signature at the current time step at step 414, and steps 410-414 are repeated until thermal signatures are captured for each time step along the scan line. Steps 410-414 may, for example, be performed by the periodicity controller 220 and Eigenmodal cooling module 218 of FIG. 2. An example method for performing the Eigenmodal cooling in step 412 is described below with reference to FIG. 5.

At steps 416-418, the simulation is further progressed such that the 3D scan-line thermal signature (determined in steps 410-414) of the longest scan-line in the 2D domain is propagated across the entire 2D slice following the progression of the heat source (e.g., laser), and the heat residual between non-overlapping domains between sequential scan lines is cooled using explicit Eigenmodes, resulting in a 3D thermal signature for an entire 2D slice (indicating the top boundary of the simulation volume so far) and the volume below it. The copying at different time steps using the longest scan-line in the 2D slice ensures that the heating part of the thermal response will be accurately represented in the domain for scan-lines of lengths equal to or lesser than the longest line. At step 416, the scan-line thermal signature (or a portion of the scan-line thermal signature) is copied to the time steps for the next sequential scan line of the current 2D slice. Then, at step 418, the heat signature(s) between the two sequential scan lines is determined, and the heat signature(s) is cooled in the non-overlapping residual domain(s) using −z diffusive Eigenmodal cooling (for example as described below with reference to FIG. 5). Steps 416 and 418 are then repeated until thermal signatures are captured for each time step in the 2D slice.

At steps 420-422, the simulation is further progressed such that the thermal signature for the 2D slice (determined in steps 416-418) and the volume below it is propagated across the entire 3D geometry following the progression of the heat source (e.g., laser), and the heat residual between non-overlapping domains between future sequential 2D slices and the volumes below them is cooled using explicit Eigenmodes, resulting in a fine spatial scale thermal solution 402 for the entire 3D geometry. Specifically, at step 420, the thermal signature of the 2D slice and the simulation volume below it (or a portion of the 2D slice thermal signature) is copied to the time steps for the next sequential slice and the volume below it in the 3D geometry. Then, at step 422, the heat signature(s) between the two sequential 2D slices and the respective simulation volumes below them is determined, and the heat signature(s) is cooled in the non-overlapping residual domain(s) using −z diffusive Eigenmodal cooling (for example as described below with reference to FIG. 5). Steps 420 and 422 are then repeated until thermal signatures are captured for each time step in the 3D geometry, providing a fine spatial scale thermal solution 402.

FIG. 5 is a flow diagram of an example method 500 for Eigenmodal cooling. The method 500 may, for example, be performed by the Eigenmodal cooling module 218 of FIG. 2. In the illustrated method, cooling is conducted using an Eigenmodal approach, solving for $C(T)\dot{T}+K(T)T=0$ in the solid domain as the cooling calculation does not occur unless powder changes its state from 0 to 1 (powder to solid). First, both simplified C and K matrices are determined as their tensor product counterparts with diffusion are only allowed in the Z direction since the powder bed is not being heated anymore. That is, the diffusion for cooling will only occur in the direction of the base plate. Because the size of the Z directional matrices is smaller than their 3D counterparts, an Eigenmodal decomposition in tensor product space for the matrix $H=(I+(C(T))^{-1}K(T)^{-1}dt$ is computed to calculate the temperature in the next time step. To provide an all-positive H matrix, an extremely small value for dt may be utilized, and henceforth sub-timestepping for cooling may be employed with $\Delta t = N dt$, where N is large.

At step 502, the matrix H is computed as $H=(I+(C(T))^{-1}K(T)^{-1}dt$, where subtime step dt equals N divisions of the time step $\Delta t$, and $C(T)$ and $K(T)$ are computed in the −z direction of the 3D geometry. Then at step 504, the value of N is set such that all values inside of the matrix $H^N$ are greater than zero. At step 506, the Eigenmodal decomposition of H is calculated in the tensor product space. Then, at step 508, the Eigenmodal cooling is determined at $T(t+\Delta t)=H^N T(t)$, using only dominant Eigenmodes of H.

Figure 6:
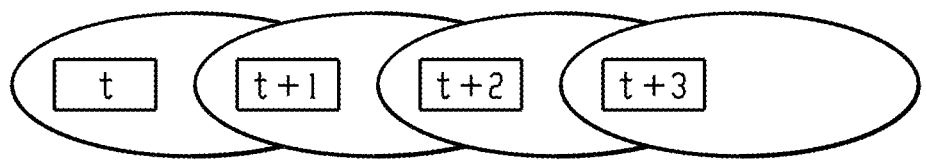
FIG. 6 is an illustration depicting and example of Eigenmodal cooling.

An example illustration of Eigenmodal cooling is shown in FIG. 6. In FIG. 6, the non-overlapped regions from t to t+2 in intervals of 1 time step each have been cooled sequentially for 3 to 1 time steps respectively at the (t+3)rd time step while adding in the new heat signature at the (t+3)rd time step to provide with the fine spatial scale thermal solution. Here, $$t > \frac{\text{Explicit Solution Length}}{\text{Scan Speed}}.$$

With reference again to FIG. 2, the fine spatial scale thermal solution that is generated by the thermal solver 208 (for example using the methods depicted in FIGS. 4 and 5) may be passed to a mesh coarsening module 210 in order to decrease the size of the output file size, producing the thermal solution 202. In embodiments, the thermal solution 202 output may also be stored as a sparse binary file. As the spatial node in the computational domain is situated at distances increasingly further away from the point of exposure by the heat source (e.g., laser), the mesh coarsening module 210 may coarsen the mesh away from the heat source with a grid spacing larger than the grid spacing near the heat source, for example using a Far Region Multiplier (FRM) grid coarsening technique. In this manner, the output temperature field of the thermal model may be coarsened using a fine length scale near the heat source and a coarse length scale away from the heat source. This scaling should be performed such that Jacobian sensitivities are met while outputting interpolated or node-on-node temperatures while upscaling the field.

Figure 7:
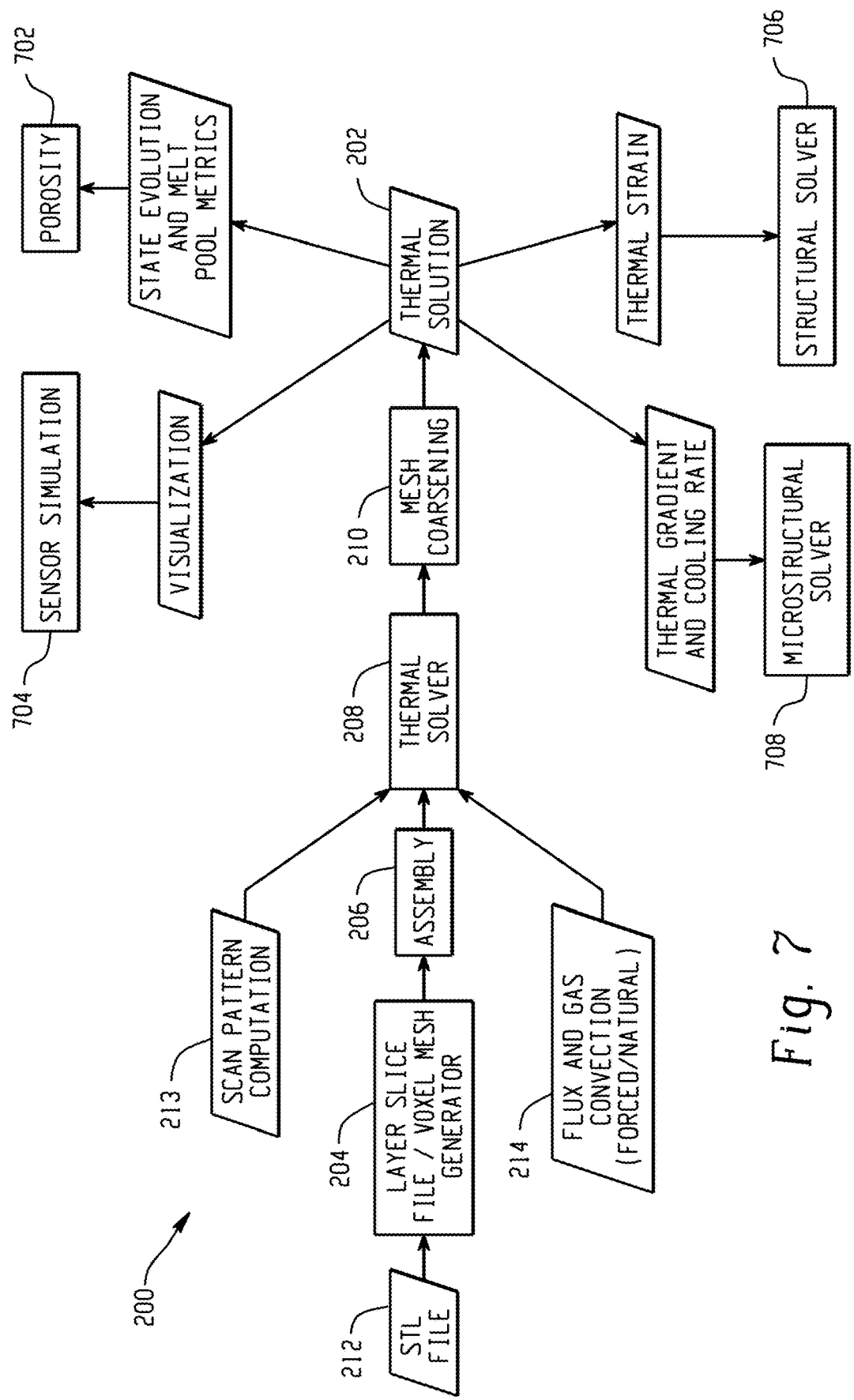
FIG. 7 is a diagram illustrating several example applications for the system of FIG. 2.

FIG. 7 depicts another system diagram 700 that illustrates several example applications for the thermal solution 202 generated by the system 200 of FIG. 2. The illustrated examples include a porosity simulation 702, a sensor simulation 704, a structural solver 706 and a microstructural solver 708. It should be understood, however, that the examples illustrated in FIG. 7 are intended to be non-limiting, and that the thermal solution 202 generated by the system of FIG. 2 may also be utilized in many other applications.

In the porosity simulation 702, state evolution and melt pool metrics may be extracted from the thermal solution 202 to simulate the porosity of the 3D geometry. The state evolution and melt pool metrics may be used to simulate which portions of each layer will melt and solidify during the additive manufacturing process. Porosity may be determined based on the percentage of each layer inside the 2D contour at each layer 204 that has not melted. The porosity simulator 704 may, for example, also be used to determine if un-melted powder within a layer contour will become melted over time during the additive manufacturing process (e.g., during application of the next layer), or whether the un-melted powder may become trapped within the geometry.

Figure 8:
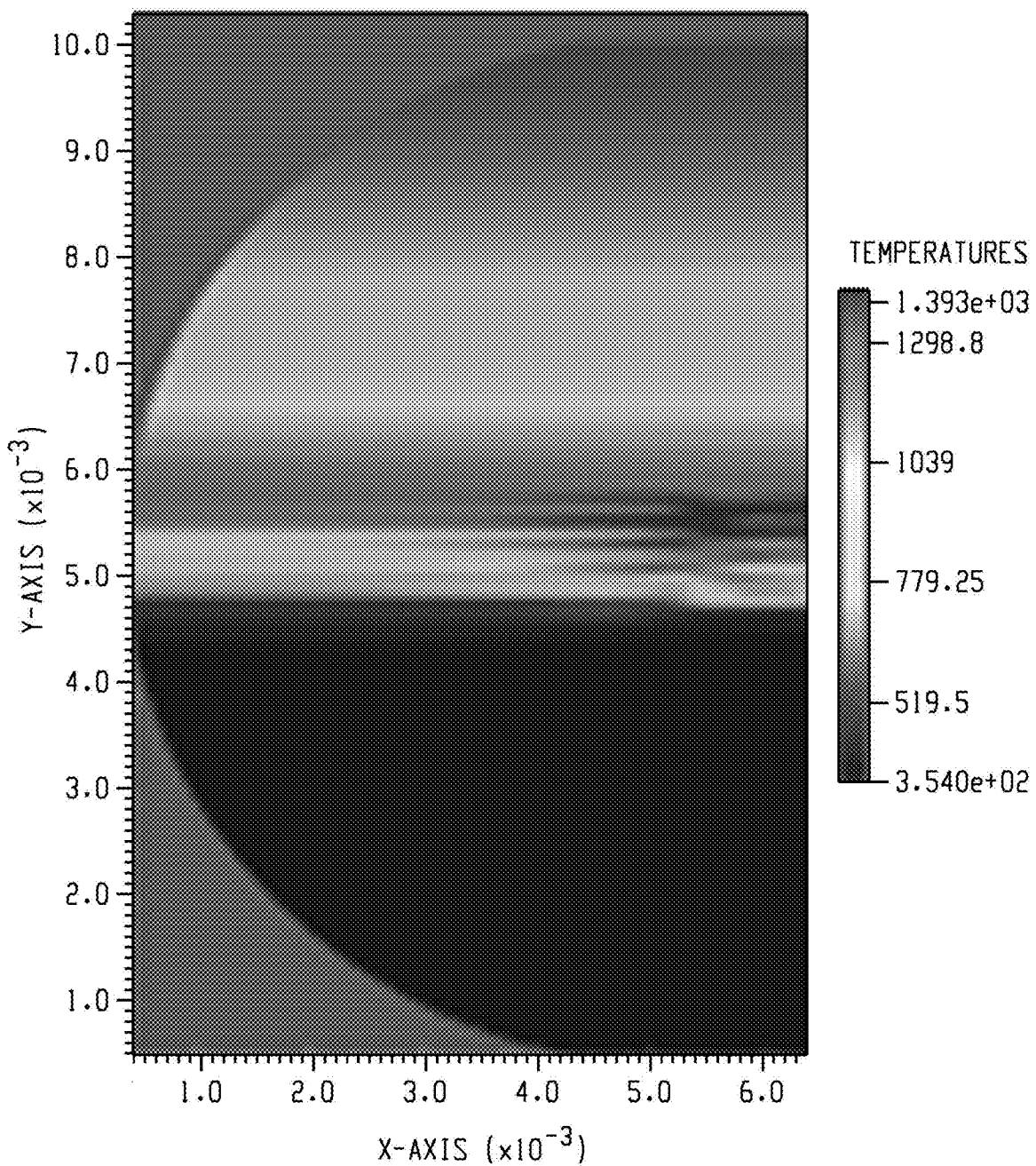
FIG. 8 is an illustration of an example sensor simulation.

The sensor simulator 704 may be used to simulate one or more virtual sensors to track and display one or more parameters of the additive manufacturing process. For example, the thermal solution 202 may be used to extract information to visualize one or more parameters using intelligent triangulation and industry standard sensor features, such as a stationary full thermal sensor, a coaxial full thermal sensor or a coaxial average sensor. As one example, the sensor simulator 704 may be used to simulate and visualize the temperature at a given point or radius during the additive manufacturing process. One example is illustrated in FIG. 8, showing a simulation of a half circular cross section as depicted by the PrintRite3D sensor from Sigma-Labs. This result shows that a sensor of 0.5 mm radius is kept at the center of the half circular cross-section and the heat signature is averaged over the points inside the circular sensor.

Figure 9B:
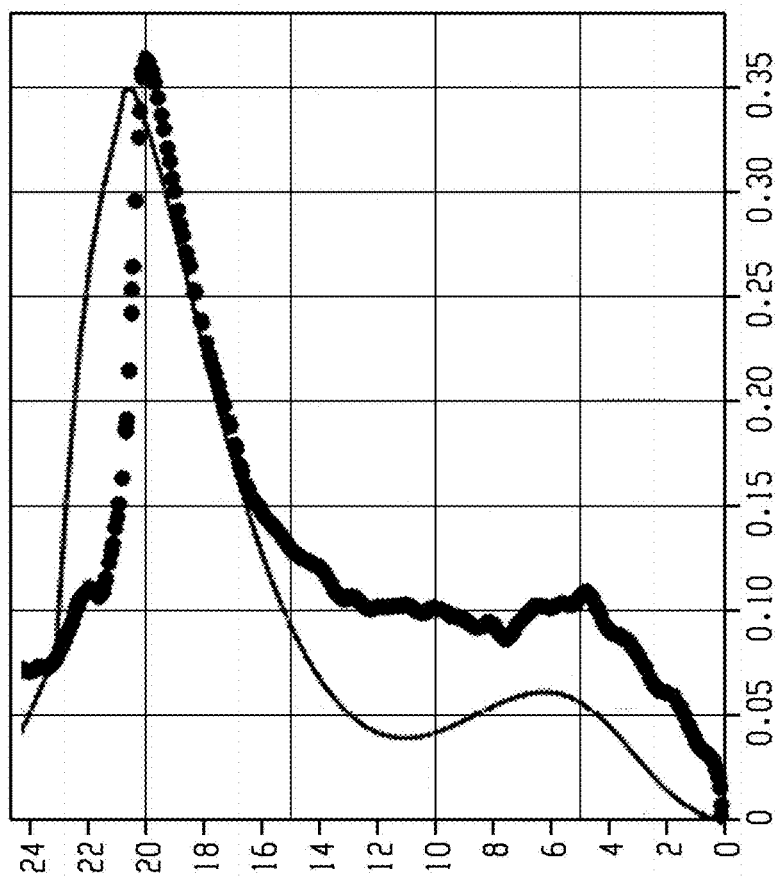
FIGS. 9A and 9B are illustrations of an example thermal strain and structural distortion simulation.
Figure 9A:
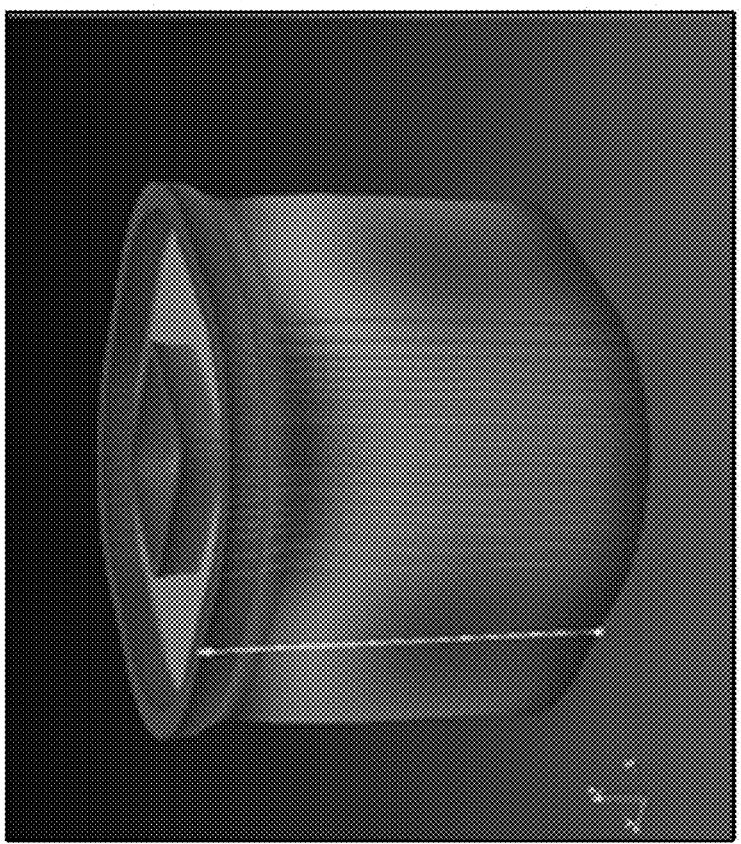

With reference again to FIG. 7, the structural solver 706 may utilize the thermal solution 202 to identify thermal strain within the 3D geometry and simulate distortion (such as shrinkage) within the 3D geometry that is caused by the thermal strain. In embodiments, the structural solver 706 may utilize one or more of the systems and methods described in U.S. Provisional Patent Application No. 62/691,677, titled "Systems and Methods for Simulating Distortion and Residual Stress in an Additive Manufacturing Process," the entirety of which is incorporated herein by reference. As a non-limiting example, FIGS. 9A and 9B illustrate distortion and residual stress simulations that may be generated by the structural solver 706 based on the thermal solution 202.

In one embodiment, a thermal solution includes a thermal response or temperature field represented at finite element nodes of a dimensional computational domain, which is solved by prescribing Dirichlet (Temperature) and Neumann (Flux) boundary conditions. In one example, a thermal solution is solved by fixing appropriate thermal and laser flux boundary conditions at a bottom of a base plate (e.g., at 353 K, 80° C., a manufacturer recommended or implemented temperature) and on the top of a current 2D slice under processing, respectively. These two sets of boundary conditions are, in one embodiment, further appended with convection and radiation conditions. In one example, top surface convection is activated for current solutions, but in other implementations, any and all combinations can be configurably adjusted on or off.

With reference again to FIG. 7, the microstructural solver 708 may utilize thermal gradient and cooling rate information extracted from the thermal solver 202 to simulate the effects and operation of the additive manufacturing process at the microstructure length scale. In embodiments, the microstructural solver 708 may utilize one or more of the systems and methods described in U.S. Provisional Patent Application No. 62/639,544, titled "Systems and Methods for Performing Microstructure Simulation and Implementation of Additive Manufacturing Processes," the entirety of which is incorporated herein by reference.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Systems and methods as described herein may be performed by a simulator, which may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes (e.g., the behavior of the one or more objects in the region of interest, the behavior of radar waves approximated by one or more rays transmitted in the simulation). The models represent behaviors of the system, while the simulation represents the operation of the system over time. In one example, one or more physical objects is fabricated based at least in part on simulations performed as described herein.

The methods and systems described herein may be implemented using any suitable processing system with any suitable combination of hardware, software and/or firmware, such as described below with reference to the non-limiting examples of FIGS. 10, 11A, 11B and 11C.

Figure 10:
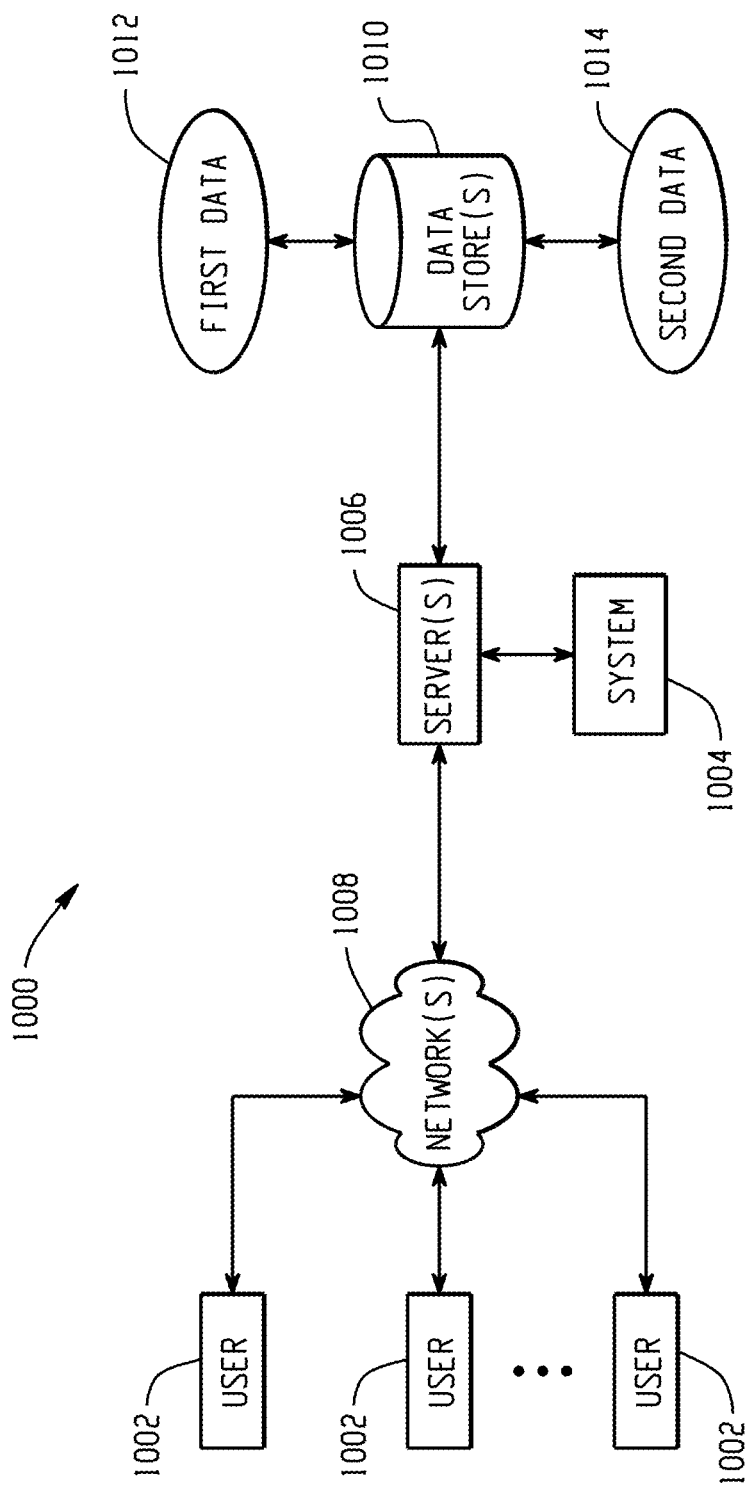
FIGS. 10, 11A, 11B and 11C depict example systems that may be used to implement the technology disclosed herein.

FIG. 10 depicts at 1000 a computer-implemented environment wherein users 1002 can interact with a system 1004 hosted on one or more servers 1006 through a network 1008. The system 1004 contains software operations or routines. The users 1002 can interact with the system 1004 through a number of ways, such as over one or more networks 1008. One or more servers 1006 accessible through the network(s) 1008 can host system 1004. It should be understood that the system 1004 could also be provided on a stand-alone computer for access by a user.

Figure 11A:
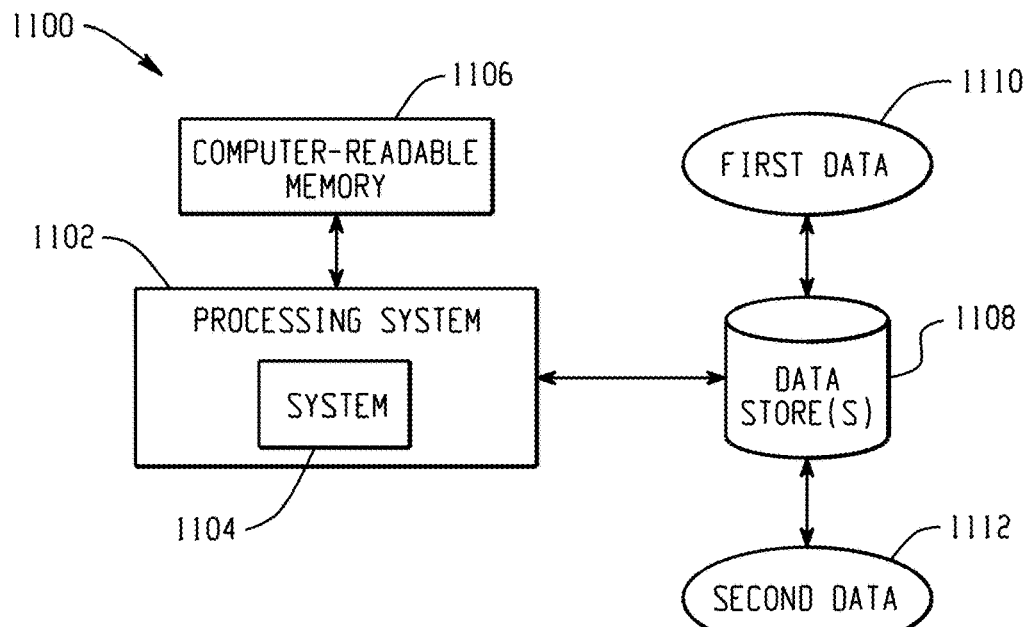
Figure 11B:
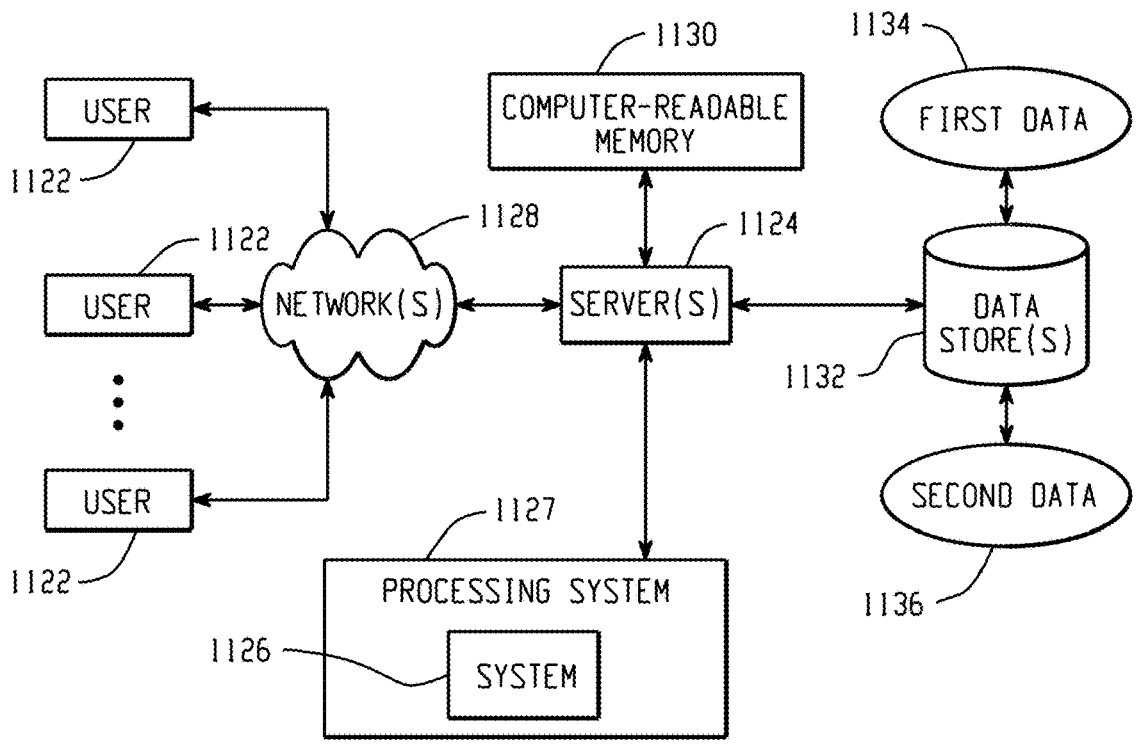
Figure 11C:
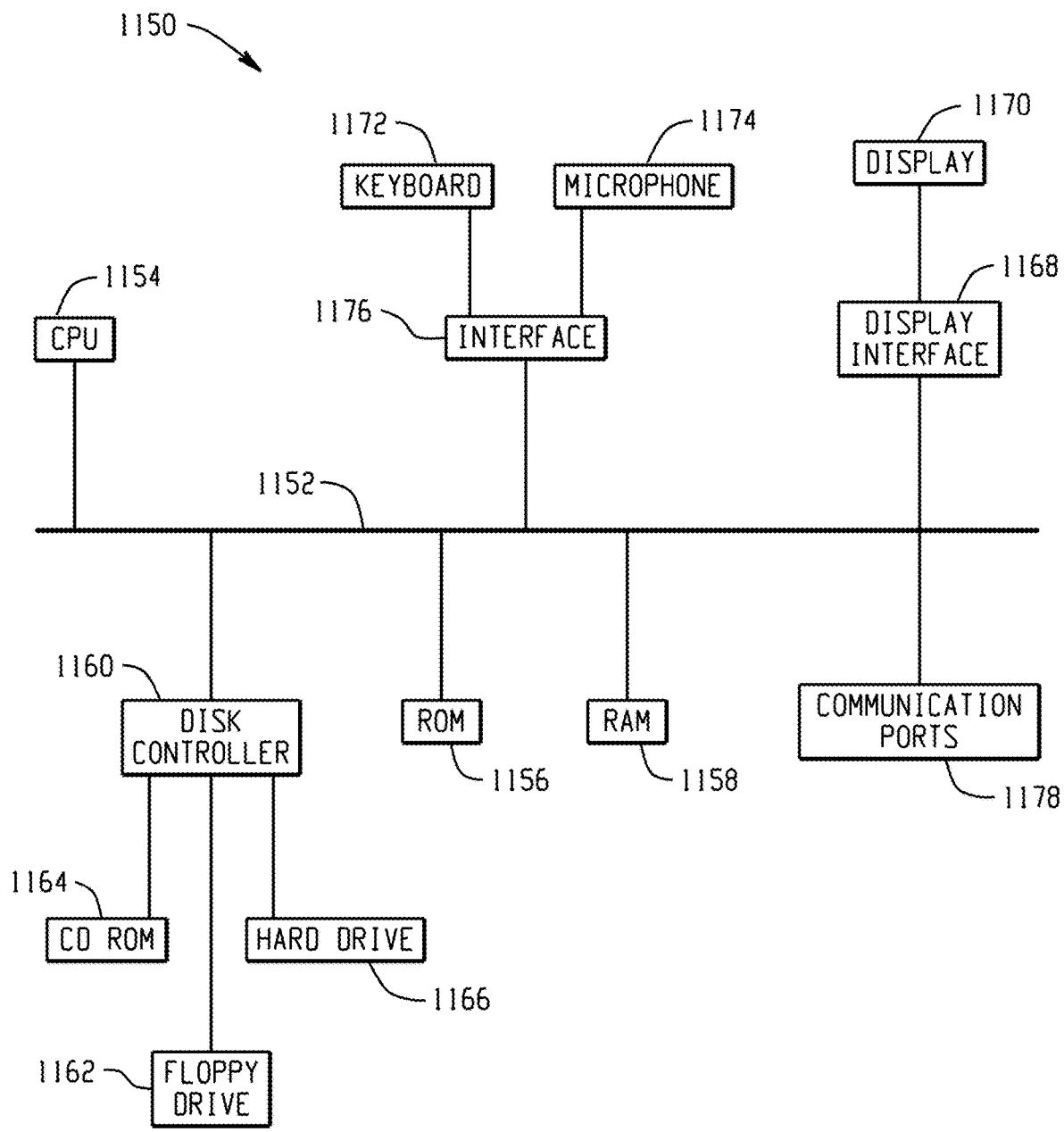

FIGS. 11A, 11B, and 11C depict example systems for use in implementing a system. For example, FIG. 11A depicts an exemplary system 1100 that includes a standalone computer architecture where a processing system 1102 (e.g., one or more computer processors) includes a system 1104 being executed on it. The processing system 1102 has access to a non-transitory computer-readable memory 1106 in addition to one or more data stores 1108. The one or more data stores 1108 may contain first data 1110 as well as second data 1112.

FIG. 11B depicts a system 1120 that includes a client server architecture. One or more user PCs 1122 accesses one or more servers 1124 running a system 1126 on a processing system 1127 via one or more networks 1128. The one or more servers 1124 may access a non-transitory computer readable memory 1130 as well as one or more data stores 1132. The one or more data stores 1132 may contain first data 1134 as well as second data 1136.

FIG. 11C shows a block diagram of exemplary hardware for a standalone computer architecture 1150, such as the architecture depicted in FIG. 11A, that may be used to contain and/or implement the program instructions of system embodiments of the present disclosure. A bus 1152 may serve as the information highway interconnecting the other illustrated components of the hardware. A processing system 1154 labeled CPU (central processing unit) (e.g., one or more computer processors), may perform calculations and logic operations required to execute a program. A non-transitory computer-readable storage medium, such as read only memory (ROM) 1156 and random access memory (RAM) 1158, may be in communication with the processing system 1154 and may contain one or more programming instructions. Program instructions may be stored on a non-transitory computer-readable storage medium such as magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 1160 interfaces one or more disk drives to the system bus 1152. These disk drives may be external or internal floppy disk drives such as 1162, external or internal CD-ROM, CD-R, CD-RW or DVD drives such as 1164, or external or internal hard drives 1166.

Each of the element managers, real-time data buffer, conveyors, file input processor, database index shared access memory loader, reference data buffer and data managers may include a software application stored in one or more of the disk drives connected to the disk controller 1160, the ROM 1156 and/or the RAM 1158. Preferably, the processor 1154 may access each component as required.

A display interface 1168 may permit information from the bus 1156 to be displayed on a display 1170 in audio, graphic, or alphanumeric format. Communication with external devices may occur using various communication ports 1178.

In addition to the standard computer-type components, the hardware may also include data input devices, such as a keyboard 1172, or other input device 1174, such as a microphone, remote control, pointer, mouse and/or joystick.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The technology described herein may provide certain advantages over known systems, some of which are detailed herein. It should be understood, however, that other advantages, in addition to those expressly detailed herein, may also be possible.

It is claimed:

1. A method for performing a thermal simulation of an additive manufacturing process, comprising:
   receiving one or more data sets that characterize an ease of heat flow through a three-dimensional (3D) geometry;
   using the one or more data sets to determine a thermal solution for an explicit solution length, wherein the explicit solution length is a length along a scan line of one two dimensional (2D) slice of the 3D geometry;
   propagating the thermal solution for the explicit solution length along sequential time steps of the scan line and using Eigenmodal cooling to adjust for cooling of a heat residual between sequential time steps to generate a thermal solution for the scan line;
   propagating the thermal solution for the scan line along sequential scan lines of the 2D slice and using Eigenmodal cooling to adjust for cooling of a heat residual between sequential scan lines to generate a thermal solution for the 2D slice;
   propagating the thermal solution for the 2D slice along sequential 2D slices of the 3D geometry and using Eigenmodal cooling to adjust for cooling of a heat residual between sequential 2D slices to generate a thermal solution for the 3D geometry; and
   simulating and visualizing, by a graphical user interface and using the thermal solution for the 3D geometry, temperature at a given point or radius for the additive manufacturing process.

2. The method of claim 1, wherein −z diffusive Eigenmodal cooling is performed in non-overlapping residual domains.

3. The method of claim 1, wherein the thermal solution for an explicit solution length is determined using a conjugate gradient Jacobi solver.

4. The method of claim 1, wherein the one or more data sets include a temperature dependent thermal conductivity matrix.

5. The method of claim 4, further comprising:
   receiving a voxel mesh file that provides a voxel grid for the 3D geometry, the voxel grid being a 3D grid having a z direction, an x direction and a y direction;
   determining a first geometric interaction between the voxel grid in the z direction with the inverse the x and y directions;
   determining a second geometric interaction between the voxel grid in the z direction with the x direction and the inverse of the y direction;
   determining a third geometric interaction between an inverse of the voxel grid in the z direction with the x and y directions;
   summing the first, second and third geometric interactions to generate a unit thermal conductivity matrix; and
   multiplying the unit thermal conductivity matrix by state- and temperature-dependent parameters to generate the temperature dependent thermal conductivity matrix.

6. The method of claim 5, wherein the unit thermal conductivity matrix is multiplied by Kpowder(T)+state*(Ksolid(T)−Kpowder(T)), wherein Kpowder(T) a thermal conductivity of a powder voxel in the 3D geometry as a function of temperature, Ksolid(T) is a thermal conductivity of a solid voxel in the 3D geometry as a function of temperature, and state is a voxel state identifier that identifies if a voxel is powder or solid.

7. The method of claim 1, wherein the one or more data sets include a temperature dependent heat capacity matrix.

8. The method of claim 7, further comprising:
   receiving a voxel mesh file that provides a voxel grid for the 3D geometry, the voxel grid being a 3D grid having a z direction, an x direction and a y direction;
   determining a geometric interaction between the voxel grid in the z direction with the the voxel grid in the x and y directions to generate a unit heat capacity matrix;
   multiplying the unit heat capacity matrix by state- and temperature-dependent parameters to generate the temperature dependent heat capacity matrix.

9. The method of claim 8, wherein the unit heat capacity matrix is multiplied by ρpowder(T)*Cpowder(T)+state*(ρsolid(T)*Csolid(T)−ρpowder(T)*Cpowder(T)), wherein ρpowder(T) is a density of a powder voxel in the 3D geometry as a function of temperature, Cpowder(T) is a specific heat of the powder voxel in the 3D geometry as a function of temperature, ρsolid(T) is a density of a solid voxel in the 3D geometry as a function of temperature, Csolid(T) is specific heat of the solid voxel in the 3D geometry as a function of temperature, and state is a voxel state identifier that identifies if a voxel is powder or solid.

10. The method of claim 1, further comprising:
    coarsening a mesh of the thermal solution for the 3D geometry at regions away from a heat source to reduce an output file size.

11. A system for performing a thermal simulation of an additive manufacturing process, comprising:
    a conjugate gradient solver configured to (1) receiving one or more data sets that characterize an ease of heat flow through a three-dimensional (3D) geometry, and (2) use the one or more data sets to determine a thermal solution for an explicit solution length, wherein the explicit solution length is a length along a scan line of one two dimensional (2D) slice of the 3D geometry;
    a periodicity controller and Eigenmodal cooling module configured to,
    propagate the thermal solution for the explicit solution length along sequential time steps of the scan line and use Eigenmodal cooling to adjust for cooling of a heat residual between sequential time steps to generate a thermal solution for the scan line, propagate the thermal solution for the scan line along sequential scan lines of the 2D slice and use Eigenmodal cooling to adjust for cooling of a heat residual between sequential scan lines to generate a thermal solution for the 2D slice, and propagate the thermal solution for the 2D slice along sequential 2D slices of the 3D geometry and using Eigenmodal cooling to adjust for cooling of a heat residual between sequential 2D slices to generate a thermal solution for the 3D geometry, the thermal solution for the 3D geometry being used to simulate and visualize temperature at a given point or radius for the additive manufacturing process.

12. The system of claim 11, wherein the Eigenmodal cooling module, under control of the periodicity controller, is configure to adjust for cooling of the heat residuals between sequential time steps, scan lines, and 2D slices using −z diffusive Eigenmodal cooling in non-overlapping residual domains.

13. The system of claim 11, wherein the one or more data sets include a temperature dependent thermal conductivity matrix.

14. The system of claim 13, further comprising an assembly module configured to:

receive a voxel mesh file that provides a voxel grid for the 3D geometry, the voxel grid being a 3D grid having a z direction, an x direction and a y direction;

determine a first geometric interaction between the voxel grid in the z direction with the inverse the x and y directions;

determine a second geometric interaction between the voxel grid in the z direction with the x direction and the inverse of the y direction;

determine a third geometric interaction between an inverse of the voxel grid in the z direction with the x and y directions;

sum the first, second and third geometric interactions to generate a unit thermal conductivity matrix; and multiply the unit thermal conductivity matrix by state- and temperature-dependent parameters to generate the temperature dependent thermal conductivity matrix.

15. The system of claim 14, wherein the unit thermal conductivity matrix is multiplied by Kpowder(T)+state*(Ksolid(T)−Kpowder(T)), wherein Kpowder(T) a thermal conductivity of a powder voxel in the 3D geometry as a function of temperature, Ksolid(T) is a thermal conductivity of a solid voxel in the 3D geometry as a function of temperature, and state is a voxel state identifier that identifies if a voxel is powder or solid.

16. The system of claim 11, wherein the one or more data sets include a temperature dependent heat capacity matrix.

17. The system of claim 16, further an assembly module configured to:

receive a voxel mesh file that provides a voxel grid for the 3D geometry, the voxel grid being a 3D grid having a z direction, an x direction and a y direction;

determine a geometric interaction between the voxel grid in the z direction with the voxel grid in the x and y directions to generate a unit heat capacity matrix; and multiply the unit heat capacity matrix by state- and temperature-dependent parameters to generate the temperature dependent heat capacity matrix.

18. The system of claim 17, wherein the unit heat capacity matrix is multiplied by ρpowder(T)*Cpowder(T)+state*(ρsolid(T)*Csolid(T)−ρpowder(T)*Cpowder(T)), wherein ρpowder(T) is a density of a powder voxel in the 3D geometry as a function of temperature, Cpowder(T) is a specific heat of the powder voxel in the 3D geometry as a function of temperature, ρsolid(T) is a density of a solid voxel in the 3D geometry as a function of temperature, Csolid(T) is specific heat of the solid voxel in the 3D geometry as a function of temperature, and state is a voxel state identifier that identifies if a voxel is powder or solid.

19. The system of claim 1, wherein a mesh of the thermal solution for the 3D geometry is coarsened at regions away from a heat source to reduce an output file size.

20. A system for performing a thermal simulation of an additive manufacturing process, comprising:

one or more processor;

one or more non-transitory computer readable medium; and a thermal solver application stored on the one or more non-transitory computer readable medium and executable by the one or more processor, the thermal solver when executed being configured to:

receive one or more data sets that characterize an ease of heat flow through a three-dimensional (3D) geometry;

use the one or more data sets to determine a thermal solution for an explicit solution length, wherein the explicit solution length is a length along a scan line of one two dimensional (2D) slice of the 3D geometry;

propagate the thermal solution for the explicit solution length along sequential time steps of the scan line and use Eigenmodal cooling to adjust for cooling of a heat residual between sequential time steps to generate a thermal solution for the scan line;

propagate the thermal solution for the scan line along sequential scan lines of the 2D slice and use Eigenmodal cooling to adjust for cooling of a heat residual between sequential scan lines to generate a thermal solution for the 2D slice;

propagate the thermal solution for the 2D slice along sequential 2D slices of the 3D geometry and use Eigenmodal cooling to adjust for cooling of a heat residual between sequential 2D slices to generate a thermal solution for the 3D geometry; and simulate and visualize, by a graphical user interface and using the thermal solution for the 3D geometry, temperature at a given point or radius for the additive manufacturing process.

* * * * *